J. P. SCHMITZ.
Stench-Traps.

No. 158,528.  Patented Jan. 5, 1875.

Attest:
John Rouen.
W. W. Wad.

Inventor:
John. Peter. Schmitz.

UNITED STATES PATENT OFFICE.

JOHN P. SCHMITZ, OF SAN FRANCISCO, CALIFORNIA.

IMPROVEMENT IN STENCH-TRAPS.

Specification forming part of Letters Patent No. 158,528, dated January 5, 1875; application filed March 9, 1874.

*To all whom it may concern:*

Be it known that I, JOHN PETER SCHMITZ, of San Francisco city and county, State of California, have invented an Improved Elastic Self-Acting Stench-Trap; and I do hereby declare the following description and accompanying drawing are sufficient to enable any person skilled in the art or science to which it most nearly appertains to make and use my said invention without further invention or experiment.

The object of my improvement on the stench-trap is to provide a trap to be convenient and reliable, for the purpose of preventing any foul odors from returning through pipes, sewers, or cess-pools.

Figure 1:
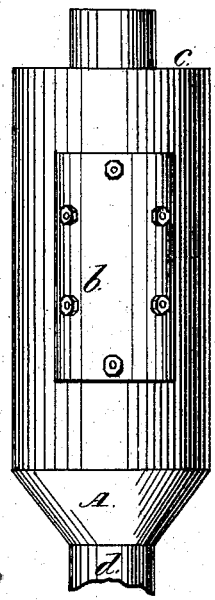
Figure 2:
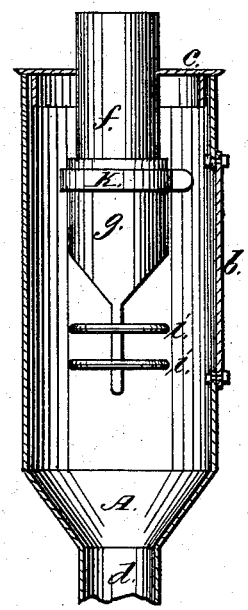
Figure 3:
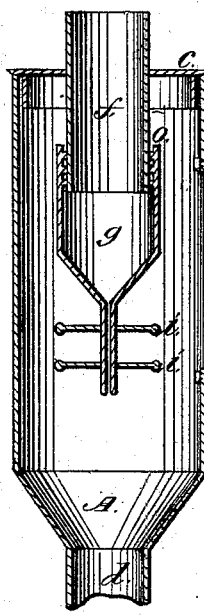
Figure 4:
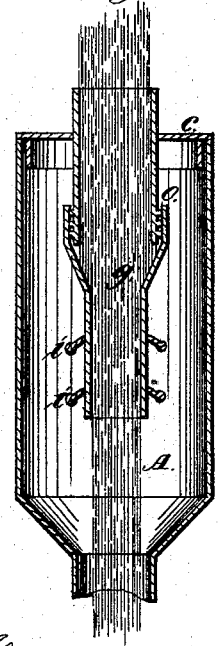
Figure 5:
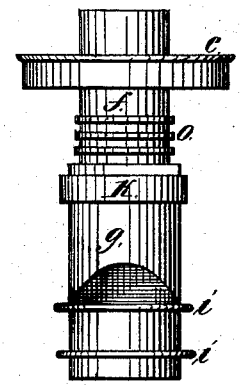

Referring to the accompanying drawing, Figure 1 is an outside view, showing the screwed-on door or cover. Fig. 2 is a section of the outer shell, showing a view of the trap inside. Fig. 3 is a sectional view of the shell and trap. Fig. 4 is a sectional view, showing the trap forced open by fluid running through it. Fig. 5 is a view of the trap, showing the upper part with the ribs or rings around the lower end, and the lower elastic self-acting part with the band or ring with which the elastic trap-piece is fastened onto the upper part.

A is the trap-case or frame, which can be made of any desired size, form, or shape. On one side of this case or frame is made a hole, which is covered by a door or cover, b, which is fastened on frame A. d is the lower end of frame A, and on this end a sewer-pipe can be connected. The upper end of this frame A has a cover, C, and through this cover is made a hole, in which a short pipe, f, is secured. This short pipe f extends only a short distance down into the frame A, as shown, and has some ribs or rings, O, fastened near the lower end, to admit the elastic self-acting trap-piece G to be fastened on pipe f. g is the elastic self-acting trap piece or pipe, which can be made of india-rubber, gutta-percha, or of any other elastic substance or material. This elastic piece or pipe is fastened on the lower end of pipe f, while the lower part of the elastic piece or pipe is made to close itself tight by having some elastic rings i around it, which will give it the desired power to close itself, as shown. K is a band or ring, which is placed around the elastic piece or pipe g, to fasten and keep it tight to pipe f. The trap case or frame A can be inserted on the upper or lower end, or at some convenient point in the length of a pipe or side sewer. If placed in the length of the pipe, then it can be done by connecting the upper pipe or portion of the sewer with the top of pipe g, while the lower portion is connected with the lower end of the trap case or frame. When thus connected, the water and other substances which pass into the pipe or sewer will have to pass through the elastic piece or pipe g and section A. The elastic self-acting trap piece or pipe g will keep itself closed until the pressure of water or other substances through it will force the elastic part open, and allow the water or other substances to escape, and when thus escaped the elastic piece or pipe g closes itself again. This trap arrangement can also be connected with cess-pools at the corners of streets or outlets of sewers in cities, in order to prevent the odor of sewers from rising into the open air. When thus connected with cess-pools or outlets of sewers, then the lower part of the trap case or frame A can be dispensed with.

This my trap improvement can be made to all sizes of traps similarly constructed, from that of a street-drain to a house-sink, all of which are equally efficacious.

I am aware that elastic wedge-shaped attachments without rings have been used with kitchen-sinks to prevent the return of foul odors, and I do not claim the idea broadly; but, as the material of which they are made soon loses its elasticity from the action of the liquids which come in contact with it, the attachment soon becomes permanently open and ineffective.

The rings in my device are intended to obviate this difficulty by re-enforcing the wedge-shaped mouth-piece, the said rings rendering the device far more durable and effective, by reason of the fact that they are not subjected to the deteriorating effect of the liquids.

Having thus described my improvements, what I claim, and desire to secure by Letters Patent, is—

1. The circular elastic rings i i, in combination with the elastic piece g, having flattened or collapsed ends, substantially as and for the purpose described.

2. The cover C and the pipe $f$ with its ribs or rings O, substantially as shown and described, for the purposes set forth.

3. The stench-trap, consisting essentially of the case A, having door $b$, the cover C, the pipe $f$ with ribs O, the elastic piece $g$, the clamping-band K, and the elastic rings $i$, all constructed and arranged substantially as shown and described.

In witness whereof I hereunto set my hand and seal.

JOHN PETER SCHMITZ. [L. S.]

Witnesses:
    JOHN KONEN,
    WM. CONRADI.